United States Patent
Laborie et al.

(10) Patent No.: US 6,550,850 B2
(45) Date of Patent: Apr. 22, 2003

(54) DEVICE FOR ABSORBING ENERGY DURING IMPACT, AND MOTOR VEHICLE DOOR COMPRISING SUCH A DEVICE

(75) Inventors: Jean-Michel Laborie, Meru (FR); Damien Demulder, Meru (FR); Patrick Febvay, Meru (FR)

(73) Assignee: Sai Automotive Allibert Industrie (FR)

( * ) Notice: Subject to any disclaimer, the term of this patent is extended or adjusted under 35 U.S.C. 154(b) by 0 days.

(21) Appl. No.: 09/974,282

(22) Filed: Oct. 9, 2001

(65) Prior Publication Data
US 2002/0113459 A1 Aug. 22, 2002

(30) Foreign Application Priority Data
Oct. 9, 2000 (FR) .............................. 00-12893

(51) Int. Cl.$^7$ ............................... B60R 21/04
(52) U.S. Cl. ...................... 296/189; 296/146.1; 188/371
(58) Field of Search ............................. 296/189, 146.5, 296/146.6, 153, 146.1; 188/377, 371; 428/166, 178, 179; 293/132, 133

(56) References Cited

U.S. PATENT DOCUMENTS

| 3,231,454 A | * | 1/1966 | Williams ..................... 428/178 |
| 3,251,076 A |  | 5/1966 | Burke |
| 4,890,877 A |  | 1/1990 | Ashtiani-Zarandi |
| 5,016,417 A |  | 5/1991 | Mentken |
| 5,470,641 A | * | 11/1995 | Shuert ..................... 108/57.27 |
| 5,599,606 A | * | 2/1997 | Disselbeck et al. ......... 264/257 |
| 5,665,456 A | * | 9/1997 | Kannankeril et al. ....... 156/209 |
| 6,247,745 B1 | * | 6/2001 | Carroll et al. .............. 188/371 |
| 6,406,079 B2 | * | 6/2002 | Tamada et al. ............. 293/120 |

FOREIGN PATENT DOCUMENTS

| DE | 4307836 A | 9/1993 |
| EP | 0916277 A | 5/1999 |
| FR | 2758155 A | 7/1998 |
| FR | 2784151 A | 4/2000 |

* cited by examiner

Primary Examiner—D. Glenn Dayoan
Assistant Examiner—Jason Morrow
(74) Attorney, Agent, or Firm—Skinner and Associates

(57) ABSTRACT

Device for absorbing energy during impact, comprising a plurality of hollow impact-absorbing elements having a first base, a side surface and an end base, each absorbing element having a crushing resistance in the direction of a working axis. According to the invention, the device comprises two base plates which face one another, the side surfaces of a portion of the plurality of hollow impact-absorbing elements rising from each plate in the direction of the working axis, and the side surfaces of the impact-absorbing elements of one base plate rising in a direction opposite that of the side surfaces of the impact-absorbing elements of the other base plate.

7 Claims, 3 Drawing Sheets

DEVICE FOR ABSORBING ENERGY DURING IMPACT, AND MOTOR VEHICLE DOOR COMPRISING SUCH A DEVICE

The invention relates to a device for absorbing energy during impact. The invention relates more particularly to a device for absorbing energy during impact, which is to be mounted in a motor vehicle.

BACKGROUND OF THE INVENTION

In order to absorb the energy released by side impact on the door of a motor vehicle, it is known to place an impact-absorbing element inside the door. This impact-absorbing element is designed to observe a biomechanical corridor. A biomechanical corridor is understood to mean a corridor defined between an upper curve and a lower curve which are represented in a plane of which the abscissa is the penetration of the test dummy's pelvis into the door and the ordinate is the force of the door on the test dummy's pelvis. Each manufacturer defines his own biomechanical corridor. For example, each of the two curves is composed of a first straight line passing through the origin and a second straight line parallel with the abscissa and forming a plateau. If the curve of the absorbing element is higher than the upper limit curve, the absorbing element is too rigid and the dummy's pelvis will be subjected to too large a force relative to the car manufacturer's criteria. If the curve of the absorbing element is lower than the lower limit curve, the absorbing element will be supple, but the high degree of penetration of the pelvis into the door resulting from that suppleness will generate inadmissible conditions of contact between the upper portion of the door and the abdomen, torso and head of the test dummy.

A first type of absorbing element in the form of a block of foam is known. The space inside the door which has to be filled by the foam is large. The width to be filled may typically be 120 mm. Since foam is an expensive material, the result will be a high cost which is incompatible with the majority of categories of vehicle.

Another type of absorbing element is based on deformable injection-moulded plastics elements. That type of absorbing element includes ribbed compartments. However, discontinuities in the biomechanical curve are observed owing to the non-optimised random breaking of the ribs.

That same type of deformable injection-moulded plastics element also includes compartments having conical impact-absorbers. Those compartments, which are described, for example, in FR 2784151, comprise a plate from which rises a plurality of frustoconical, hollow, impact-absorbing elements, each absorbing element exhibiting crushing resistance. The major disadvantage of those structures having conical impact-absorbing elements results from their excessive height (120 mm) which may lead to a buckling of the whole structure during impact. Another disadvantage of that type of structure results from the angle condition of the truncated cone which must be from 10 to 15 degrees for optimised mechanical strength. Owing to the great height, the truncated cones corresponding to the angle condition have a large base of major proportions limiting the number of truncated cones per structure.

SUMMARY OF THE INVENTION

One of the objects of the present invention is to propose an absorption device of the deformable injection-moulded plastics element type, which overcomes the disadvantages mentioned above.

Another object of the present invention is to propose an absorption device, the manufacture of which is simple and economical.

For those purposes, the invention relates to a device for absorbing energy during impact, comprising a plurality of hollow impact-absorbing elements, each absorbing element having a crushing resistance. According to the invention, it comprises two base plates facing one another, a portion of the plurality of impact-absorbing elements rising from each plate, and the impact-absorbing elements of one plate rising in a direction opposite that of the impact-absorbing elements of the other plate.

Advantageously, the absorbing elements have a frustoconical shape.

According to another feature according to the invention, the large base of the absorbing elements is elliptical.

In one embodiment, the bases of the absorbing elements of one plate are offset relative to the bases of the absorbing elements of the other plate.

Advantageously, the offset is angular.

In one embodiment, each absorbing element of one plate corresponds to an absorbing element of the other plate, the absorbing elements being coaxial in the direction of an impact axis and being offset angularly relative to one another about that impact axis.

In order to simplify manufacture and assembly, the absorbing device is moulded in a single piece and comprises a film hinge between the two facing base plates.

The invention relates also to a motor vehicle door comprising a device for absorbing impact energy arranged between an outer wall and an inner wall. According to the invention, the energy-absorbing device is a device such as described above.

A first advantage of the present invention results from the division of the absorption device of the prior art into two sub-structures. Consequently, the height of the truncated cones is divided by two, which multiplies the overall critical buckling load by four. That substantially reduces the risk that the absorption device will buckle in the case of impact.

Another advantage of the present invention results from the ellipsoidal or oblong shape of the large base of the truncated cones. This feature enables the facing absorbing elements to be offset in such a manner that a not inconsiderable portion of the periphery of the large base of one of the absorbing elements rests on the plate of the other absorber.

BRIEF DESCRIPTION OF THE DRAWINGS

Other advantages and features of the present invention will emerge from the following description which is given with reference to the appended drawings in which.

DESCRIPTION OF THE PREFERRED EMBODIMENT

Figure 1:
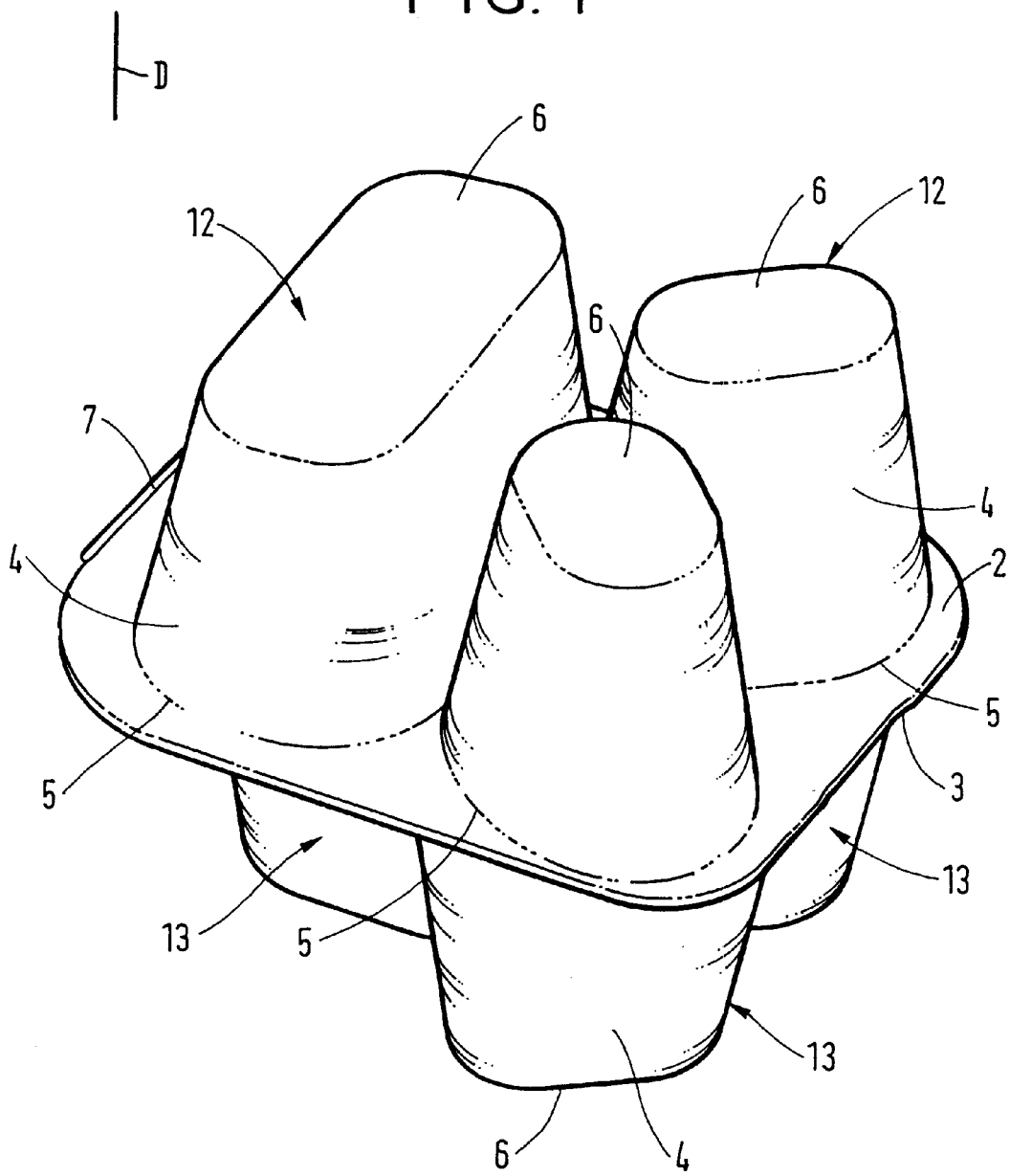
FIG. 1 is a diagrammatic perspective representation of a device according to the present invention.

The invention relates to an impact-absorbing device of injection-moulded plastics material. The absorption device comprises two base plates 2, 3 which face one another and are in contact with one another and which are perpendicular to a working axis D of the absorption device. Rising from each base plate 2, 3 in the direction of the axis D is a plurality of impact-absorbing elements 12, 13. The impact-absorbing elements 12 of one plate 2 rise in the direction opposite the direction of the impact-absorbing elements 13 of the other base plate 3. Each absorbing element 12, 13 comprises a first base 5 located on the base plate 2, 3, a side wall 4 erected in the direction of the axis D, starting from the first base, and an end base 6 located opposite the first base 5 relative to the side wall 4.

Each absorbing element 12, 13 has a crushing resistance in the direction of the axis D. The crushing resistances may differ from one absorbing element to another. In particular, the crushing resistances of the impact-absorbing elements 12, 13 are calculated to correspond to a pre-established impact-absorption cartography in the door panel. The crushing resistance of an absorbing element is notably a function of the shape of the bases 5, 6 and of the shape and the height of the side wall 4. In the embodiments shown in the drawings, the impact-absorbing elements 12, 13 are hollow. The thickness e of the absorbing elements 12, 13 is also a parameter for the crushing resistance.

Advantageously, the absorbing elements are in the shape of a truncated cone: the bases 5, 6 and the base plates 2, 3 are parallel with one another, the first base 5 constituting the large base 5 of the truncated cone.

Figure 2:
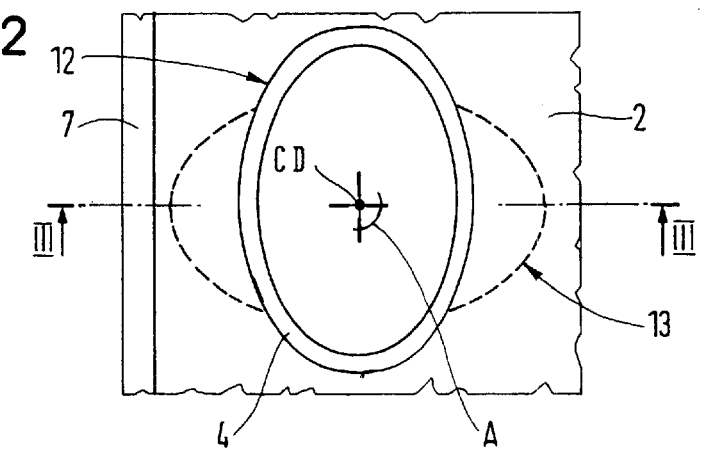
FIG. 2 is a diagrammatic representation of a detail of a device according to the present invention.
Figure 3:
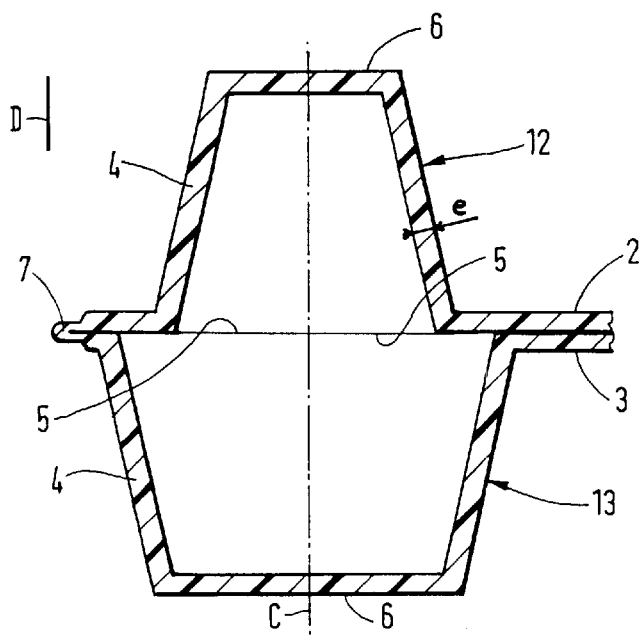
FIG. 3 is a diagrammatic representation in section along the line III—III in FIG. 2.

In the embodiment shown in the drawings, the large base 5 of the absorbing elements 12, 13 has a length larger than its width. The large base 5 has, for example, an oblong shape as in FIG. 1 or an ellipsoidal shape as in FIGS. 2 to 4.

In the embodiment with the hollow absorbing elements, in order to ensure maximum mechanical connection between the absorbing elements 12 of one plate 2 and the absorbing elements 13 of the other plate 3, the first bases 5 of the absorbing elements 12 of one plate 2 are positioned relative to the first bases 5 of the absorbing elements 13 of the other plate 3 in such a manner that a not inconsiderable portion of the periphery of the first base 5 of the absorbing elements 12, 13 of one base plate 2, 3 is in direct contact with the other base plate 3, 2.

In one embodiment, at least one absorbing element 12, 13 of one base plate 2, 3 has an absorbing element 13, 12 arranged directly opposite it on the other base plate 3, 2. In order to ensure mechanical connection, the bases of the facing absorbing elements are offset angularly about an impact axis C parallel with the axis D.

In the embodiment shown in the drawings, each absorbing element of one plate corresponds to an absorbing element of the other plate. The absorbing elements are coaxial in the direction of their impact axis C and are offset relative to one another according to an angle A about the impact axis C. The base plates are fixedly joined to one another.

Advantageously, the facing absorbing elements have the same shape and dimensions and are offset by a quarter turn relative to one another.

The absorption device according to the invention may advantageously be moulded in a single piece and comprises a film hinge 7 between the two facing base plates 2, 3. The material used may be any mouldable plastics material, with or without filler.

Figure 4:
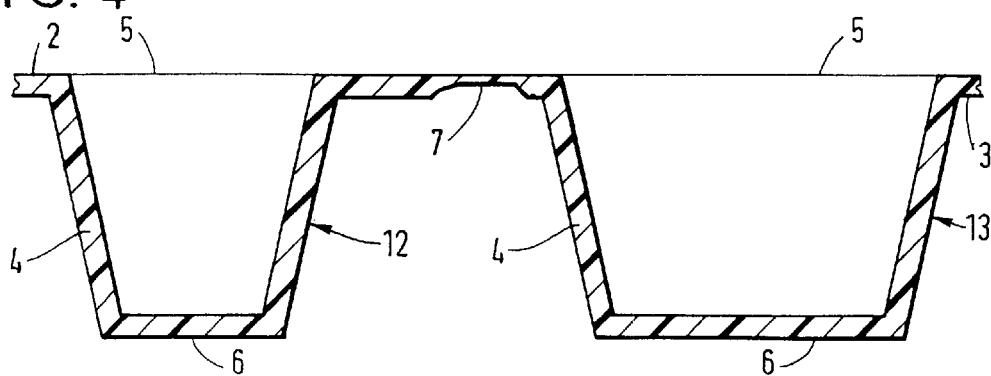
FIG. 4 is a diagrammatic sectional view of a detail of a device according to the present invention after moulding.

The manufacture and assembly of the device are as follows:

The two base plates 2, 3 and all of the absorbing elements 12, 13 are moulded in an open position in one operation and in a single piece. The two base plates 2, 3 are connected to one another by a film hinge 7. A detail of the resulting plastics part is shown in FIG. 4.

The two base plates 2, 3 are folded one onto the other by pivoting about the film hinge 7.

The two facing base plates are fixedly joined to one another. Any known means of fixedly joining the base plates to one another may be used, such as, notably, adhesive bonding, welding, riveting, clipping, etc. The base plates are advantageously fixedly joined to one another in order to keep them in the folded position and to obstruct any sliding of the one on the other.

The invention relates also to a motor vehicle door comprising a device for absorbing impact energy 100 arranged between an outer wall 20 and an inner wall 21. According to the invention, the energy-absorption device 100 is a device such as described above.

Figure 5:
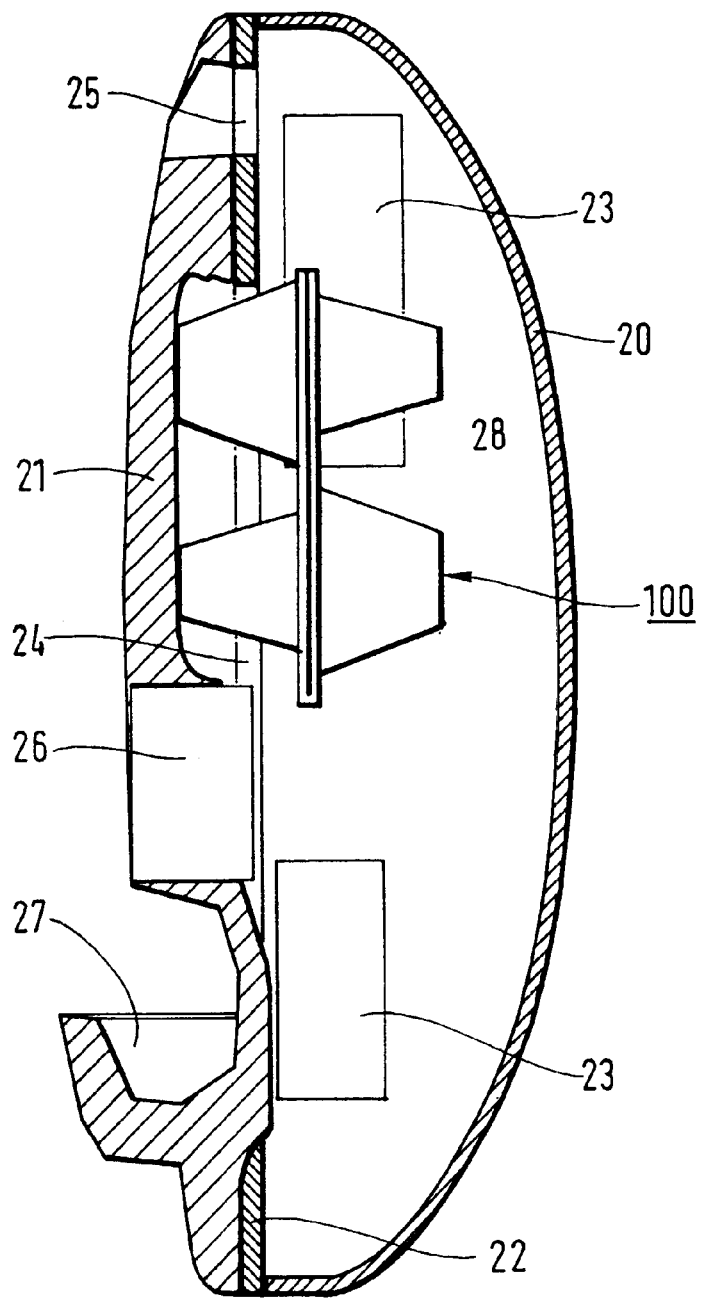
FIG. 5 is a diagrammatic sectional representation of a door according to the present invention.

FIG. 5 is a diagrammatic sectional view of a door according to the invention. The door comprises an outer metal sheet 20, an intermediate metal sheet 22 and an inner carrier 21. The device for absorbing impact energy 100 is secured to the inner carrier 21 by any known means (snap-riveting, welding, clipping, adhesive bonding, etc. . . . ). The intermediate metal sheet has an opening 24 enabling the device for absorbing impact energy 100 to pass through. The device for absorbing impact energy 100 is left free on the side where the outer metal sheet 20 is arranged. The space 28 left between the device for absorbing impact energy 100 and the outer metal sheet 20 is necessary to enable the window pane of the door to pass through.

It will be appreciated that the present invention is not limited to the embodiments shown. A large number of variations are possible without departing from the scope of the present invention.

We claim:

1. Device for absorbing energy during impact, comprising a first base plate and a second base plate which face one another and which are in contact with one another, and a plurality of first hollow impact-absorbing elements and second hollow impact-absorbing elements, the first impact-absorbing elements having a first side surface between an end base and a first base, each first impact-absorbing absorbing element rising from the first base plate, the second impact-absorbing elements having a second side surface between a second end base and a second base, each second impact-absorbing element rising from the second base plate, the first impact-absorbing elements rise from the first base plate in a first direction the second impact-absorbing elements rise from the second base plate in a second direction, the first direction is opposite to the second direction, the first base of at least one of the first impact-absorbing elements has a first length along a first elongated axis and has a first width transverse thereto, said first impact-absorbing element is substantially coaxial with a corresponding second absorbing element, said corresponding element has a second length along a elongated second axis and has a second width transversal thereto, the first length of the first impact-absorbing element is substantially equal to the second length of the corresponding second impact-absorbing element and the first elongated axis is angularly offset relative to the second elongated axis.

2. Device according to claim 1, wherein the hollow absorbing elements have a frustoconical shape.

3. Device according to claim 1, wherein the device is produced from moulded plastics material with filler and moulded in a single piece, and comprises a film hinge between the two facing base plates.

4. Device according to claim 1, wherein the device is produced from moulded plastics material without filler and moulded in a single piece, and comprises a film hinge between the two facing base plates.

5. Motor vehicle door comprising a device for absorbing impact energy arranged between an outer wall of the door and an inner wall of the door, wherein the energy-absorption device is a device according to claim 1.

6. Device for absorbing energy during impact, comprising a plurality of hollow impact-absorbing elements having a first base, a side surface and an end base, each absorbing element having a crushing resistance in the direction of a working axis, wherein the device comprises two base plates which face one another and which are in contact with one another, the side surfaces of a portion of the plurality of hollow impact-absorbing elements rising from each plate in the direction of the working axis, and the side surfaces of the impact-absorbing elements of one base plate rising in a direction opposite that of the side surfaces of the impact-absorbing elements of the other base plate, wherein the device is produced from moulded plastics material with filler and moulded in a single piece, and comprises a film hinge between the two facing base plates.

7. Device for absorbing energy during impact, comprising a plurality of hollow impact-absorbing elements having a first base, a side surface and an end base, each absorbing element having a crushing resistance in the direction of a working axis, wherein the device comprises two base plates which face one another and which are in contact with one another, the side surfaces of a portion of the plurality of hollow impact-absorbing elements rising from each plate in the direction of the working axis, and the side surfaces of the impact-absorbing elements of one base plate rising in a direction opposite that of the side surfaces of the impact-absorbing elements of the other base plate, wherein the device is produced from moulded plastics material without filler and moulded in a single piece, and comprises a film hinge between the two facing base plates.

* * * * *